US012594822B2

(12) United States Patent
Mankame et al.

(10) Patent No.:     US 12,594,822 B2
(45) Date of Patent:          Apr. 7, 2026

(54) SUPER ELASTIC SHAPE MEMORY ALLOYS BASED SOLID-STATE VIBRATION ISOLATION ELEMENTS FOR ELECTRIC DRIVETRAINS

(71) Applicant: GM Global Technology Operations LLC, Detroit, MI (US)

(72) Inventors: Nilesh D. Mankame, Ann Arbor, MI (US); Nitish Jayaram Wagh, Novi, MI (US); Dennis J. Kinchen, Brighton, MI (US); Sam Mohamed Jomaa, Warren, MI (US); Wojciech Edward Suchta, Richmond Hill (CA)

(73) Assignee: GM GLOBAL TECHNOLOGY OPERATIONS LLC, Detroit, MI (US)

( * ) Notice:     Subject to any disclaimer, the term of this patent is extended or adjusted under 35 U.S.C. 154(b) by 470 days.

(21) Appl. No.: 18/164,161

(22) Filed:     Feb. 3, 2023

(65)          Prior Publication Data
       US 2024/0262173 A1     Aug. 8, 2024

(51) Int. Cl.
    *F16F 15/04*       (2006.01)
    *B60K 1/00*        (2006.01)
    *B60K 5/12*        (2006.01)
    *F16F 15/02*       (2006.01)
    *F16F 15/08*       (2006.01)

(52) U.S. Cl.
    CPC .............. *B60K 1/00* (2013.01); *B60K 5/1208* (2013.01); *F16F 15/02* (2013.01); *F16F 15/04* (2013.01); *F16F 15/08* (2013.01); *F16F 2224/0258* (2013.01); *F16F 2228/08* (2013.01)

(58) Field of Classification Search
    CPC .......... F16F 15/04; F16F 15/06; F16F 15/063; F16F 15/073; F16F 2224/0258; F16F 15/02; F16F 15/08; B60K 1/00; B60K 1/02; B60K 5/1208; B60K 5/1216
    See application file for complete search history.

(56)          References Cited

U.S. PATENT DOCUMENTS 5,274,413  A  *  12/1993  Nomura .................. G03B 17/14
                                                      396/529
5,398,916  A  *   3/1995  Kramer ..................... F16F 7/01
                                                      148/402
                    (Continued)

FOREIGN PATENT DOCUMENTS

CN        111853039 A  *  10/2020  ........... E21D 11/083
CN        113374825 A  *   9/2021  ............ F16F 15/022
                    (Continued)

OTHER PUBLICATIONS

CN-113374825-A. (Year: 2021).*
                    (Continued)

*Primary Examiner* — Thomas J Williams
(74) *Attorney, Agent, or Firm* — Vivacqua Crane, PLLC

(57)          ABSTRACT
A vibration isolation component and vibration isolation system for a drivetrain as well as a method of isolation vibration in a drivetrain. At least one of a drivetrain bracket and a bushing inserted into an end of the drivetrain bracket is a vibration isolation element and includes a super elastic shape memory alloy element. The drivetrain bracket is affixed to an electric drivetrain and the bushing is connected a chassis.

18 Claims, 9 Drawing Sheets

(56) References Cited

U.S. PATENT DOCUMENTS

| | | | | |
|---|---|---|---|---|
| 6,116,587 | A * | 9/2000 | Miyahara | B60K 5/1216 |
| | | | | 267/140.12 |
| 7,445,076 | B2 * | 11/2008 | Shigematsu | B60K 5/1216 |
| | | | | 180/300 |
| 10,119,587 | B2 * | 11/2018 | Watanabe | B64G 1/22 |
| 2021/0039799 | A1 * | 2/2021 | Sharma | B64D 27/406 |
| 2021/0040865 | A1 * | 2/2021 | Ganiger | F16C 19/06 |
| 2022/0333667 | A1 | 10/2022 | Jomaa et al. | |
| 2024/0262173 | A1 * | 8/2024 | Mankame | F16F 15/04 |

FOREIGN PATENT DOCUMENTS

| | | | | | |
|---|---|---|---|---|---|
| EP | 0290328 | A1 * | 11/1988 | | F16F 9/0409 |
| JP | 60208644 | A * | 10/1985 | | F16F 3/10 |

OTHER PUBLICATIONS

EP-0290328-A1 (Year: 1988).*
JP-60208644-A (Year: 1985).*
CN-111853039-A (Year: 2020).*
U.S. Appl. No. 17/385,673 to Jomaa et al., filed Jul. 26, 2021.
Schaffer, Jeremy, Cyclic energy dissipation in shape memory alloys, Fort Wayne Metals Research Products Corp 2013.
J Van Humbeeck, Damping capacity of thermoelastic martensite in shape memory alloys, Journal of Alloys and Compounds vol. 355, Issues 1-2, Jun. 30, 2003, pp. 58-64.

* cited by examiner 136,144,160

192,160

194,160

196,160

198,160

200,160

202,160

400

402

404

406

408

410

SUPER ELASTIC SHAPE MEMORY ALLOYS BASED SOLID-STATE VIBRATION ISOLATION ELEMENTS FOR ELECTRIC DRIVETRAINS

BACKGROUND

A significant body of work has been developed around isolation and dampening of vibration in internal combustion engine vehicles to improve ride comfort. A combination of design features and materials have been employed to mitigate vibration. For example, motor mounts have been developed to reduce the transmission of engine vibration to the vehicle chassis and body. In addition, various forms of insulation are provided to reduce the transmission of noise into the passenger compartment. Similarly, electric drivetrains exhibit vibration that may be transmitted through the chassis and body of the vehicle into the passenger compartment. However, in electric vehicles, the vibration frequencies are relatively higher than exhibited by internal combustion engines. The materials and design features previously used to isolate and dampen vibration may not readily translate to use in electric vehicles over the range of frequencies exhibited by electric vehicles.

Thus, while current isolation and mitigation devices and materials have achieved their intended purpose, room remains for development of materials and design features for use in electric drivetrains.

SUMMARY

According to various aspects, the present disclosure is directed to a vibration isolation system for a drivetrain. The vibration isolation system includes a drivetrain bracket including a first end and a second end and a bushing inserted into the second end of the drivetrain bracket. At least one of the drivetrain bracket and the bushing is a vibration isolation element and includes a super elastic shape memory alloy element.

In embodiments of the above, the super elastic shape memory alloy element is pre-strained to lie on a phase transformation plateau.

In any of the above embodiments, a plurality of posts extend from the drivetrain bracket, wherein the super elastic shape memory alloy element is a wire affixed to the posts.

In any of the above embodiments, the super elastic shape memory alloy element is embedded in the drivetrain bracket. In further embodiments, the super elastic shape memory alloy element includes one or more of the following: a wire wrapped around a post, a strip, fibers and particles.

In any of the above embodiments, the drivetrain bracket defines a bushing opening and the super elastic shape memory alloy element is in the form of a ring embedded in the bushing opening.

In any of the above embodiments, the bushing includes a rubber component and the rubber component includes the super elastic shape memory alloy element connected to the rubber component. In further embodiments, the super elastic shape memory alloy element includes at least one of the following: an inner ring and an elongate fin. In yet further embodiments, the bushing includes a body and wings extending from the body, wherein the wings include the super elastic shape memory alloy elements.

In any of the above embodiments, at least one spring element is insertable between the drivetrain bracket and the drivetrain. In further embodiments, the spring element is a spring washer and the spring washer includes a super elastic shape memory alloy.

In any of the above embodiments, the first end of the bracket is affixed to an electric drivetrain and the second end of the drivetrain bracket is connected to a chassis.

According to various aspects, the present disclosure is also directed to a vibration isolation component for a vehicle. The vibration isolation component includes a drivetrain bracket including a first end, a second end and a central portion between the first end and the second end. The vibration isolation component also includes an opening defined in a second end of the drivetrain bracket and a super elastic shape memory alloy element integrated with the drivetrain bracket.

In embodiments, the super elastic shape memory alloy element is embedded into the central portion of the drivetrain bracket.

In any of the above embodiments, the super elastic shape memory alloy element is connected to a surface of the drivetrain bracket.

In any of the above embodiments, the super elastic shape memory alloy element lines the opening.

In any of the above embodiments, the super elastic shape memory alloy element is under strain.

According to various further aspects, the present disclosure is directed to a method of isolating vibration in a drivetrain. The method includes affixing a drivetrain bracket to an electric drivetrain, wherein the drivetrain bracket includes a first end, a second end, and a central portion, wherein the electric drivetrain is affixed at a first end. The method further includes inserting a bushing into an opening defined in the second end of the drivetrain bracket and connecting the bushing to a chassis. At least one of the drivetrain bracket and the bushing includes a super elastic shape memory alloy element.

In embodiments, the method further includes pre-straining the super elastic shape memory alloy element before affixing the drivetrain bracket to the electric drivetrain.

In any of the above embodiments, the method includes inserting a spring element between the drivetrain bracket and the electric drivetrain and the spring element includes a super elastic shape memory alloy.

BRIEF DESCRIPTION OF DRAWINGS

The drawings described herein are for illustration purposes only and are not intended to limit the scope of the present disclosure in any way.

DETAILED DESCRIPTION

Figure 1A:
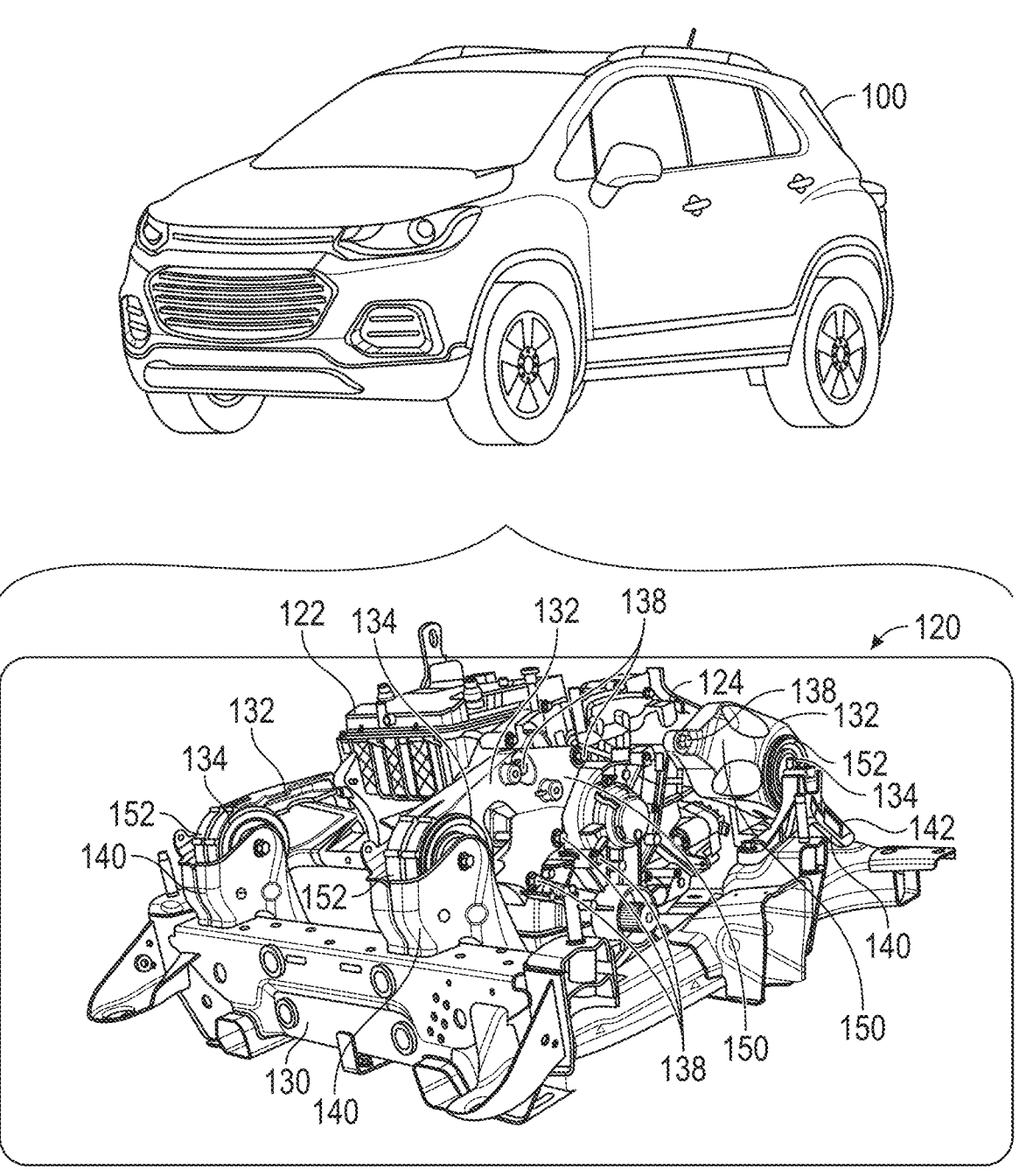
FIG. 1A illustrates an embodiment of a vehicle including a vibration isolation system for a vehicle according to various aspects of the present disclosure.

The following description is merely exemplary in nature and is not intended to limit the present disclosure, application, or uses. Furthermore, there is no intention to be bound by any expressed or implied theory presented in the preceding introduction, summary, or the following detailed description. It should be understood that throughout the drawings, corresponding reference numerals indicate like or corresponding parts and features.

As used herein, the term "vehicle" is not limited to automobiles. While the present technology is described primarily herein in connection with electric vehicles, the technology is not limited to electric vehicles. The concepts can be used in a wide variety of applications, such as in connection with motorcycles, mopeds, locomotives, aircraft, marine craft, and other vehicles, as well as in other applications where vibration isolation and damping may be incorporated, such as in applications incorporating electric motors. Applications include, for example, industrial machines and motors, agricultural equipment, compressors, defense equipment, HVAC systems, residential and commercial power generators, and pumps.

Reference will now be made in detail to several examples of the disclosure that are illustrated in accompanying drawings. Whenever possible, the same or similar reference numerals are used in the drawings and the description to refer to the same or like parts or steps. The drawings are in simplified form and are not to precise scale.

The present disclosure is directed to a vibration isolation system for an electric drivetrain and one or more vibration isolation components used in the vibration isolation system including super elastic shape memory alloy elements formed from a super elastic shape memory alloy. Vibration isolation is understood herein as the damping of or reducing the transmittance of vibrations across components in a system, or in a component itself. The super elastic shape memory alloy elements provide frequency and temperature independent damping for electric drivetrains in the 10 Hz to 3,000 Hz frequency range.

Reference is made to FIG. 1A illustrating a vehicle 100. Within the vehicle 100 is mounted an electric drivetrain 120. The electric drivetrain 120 includes an electric motor 122 and a transmission 124 among other components. The electric drivetrain 120 is mounted to a vehicle chassis 130 by a vibration isolation system including a number of components connected between the electric drivetrain 120 and the chassis 130. The vibration isolation system components include, but are not limited to, a drivetrain bracket 132 that connects to the electric drivetrain 120 and a bushing 134 that connects the drivetrain bracket 132 to the chassis 130. At least one of the vibration isolation system components, i.e., the drivetrain bracket 132 and bushing 134, includes a super elastic shape memory alloy element 160 (see FIGS. 3A through 7G below). The super elastic shape memory alloy element 160 may form the entire vibration isolation component, be embedded in the vibration isolation component, or may be connected to the vibration isolation component. In further embodiments, the vibration isolation system further includes at least one spring element 136 (see FIG. 1B) insertable between the drivetrain bracket 132, which may also provide a super elastic shape memory alloy element 160. In embodiments, the bushing 134 is connected to a mounting bracket 140 connected to the chassis 130 and, optionally, a second spring element 144 is placed between the mounting bracket 140 and the chassis 130. In yet further embodiments, the drivetrain bracket 132 is omitted and the bushing is connected directly to the electric drivetrain 120.

Figure 1B:
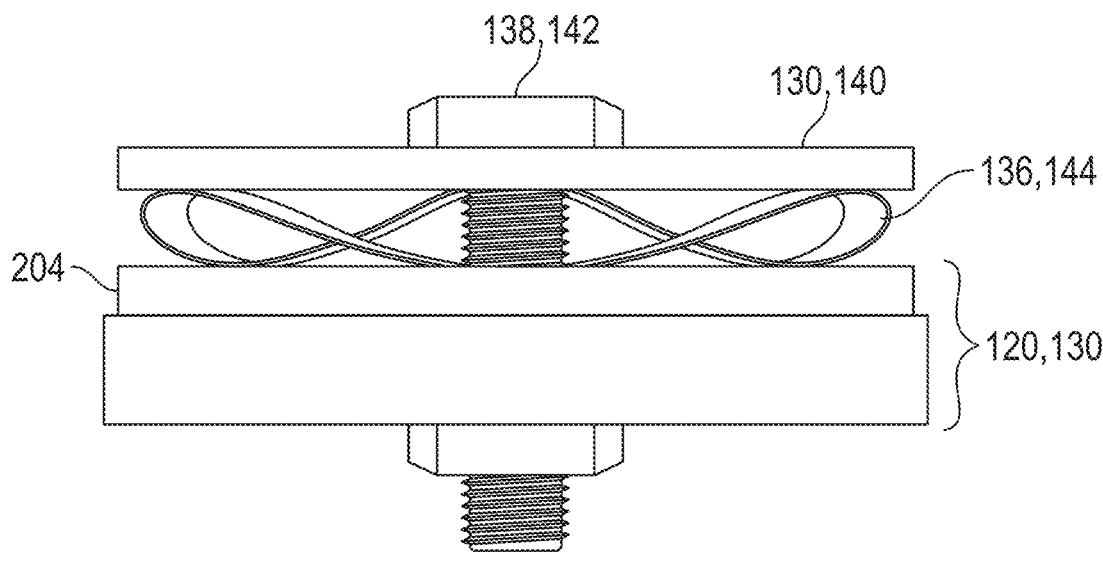
FIG. 1B illustrates an embodiment of a vibration isolation component for a vehicle according to various aspects of the present disclosure.

As illustrated in FIG. 1A and noted above, the first end 150 of a drivetrain bracket 132 is connected to the electric drivetrain 120 and the second end of 152 of the drivetrain bracket 132 is connected to a bushing 134. Three drivetrain brackets 132 are illustrated in FIG. 1A; however, more than three brackets, such as four or more brackets, may be provided. Each drivetrain bracket 132 is connected to the electric drivetrain 120 at a different point around the electric drivetrain 120. The drivetrain brackets 132 are also connected to the electric drivetrain 120 by a number of mechanical fasteners 138, such as bolts (see also FIG. 1B). As noted above, spring elements 136, which may also include a super elastic shape memory alloy, (see FIG. 7B) may be placed around the bolts, like washers, and sandwiched between the drivetrain bracket 132 and the electric drivetrain 120 as illustrated in FIG. 1B. The spring elements 136 may include, e.g., spring washers 136, 144 (see FIG. 7A) or wave springs 192.

In the embodiment illustrated in FIG. 1A, the bushings 134 are each connected to a mounting bracket 140 and the mounting brackets 140 are connected to the chassis 130 with mechanical fasteners 142, such as a bolt. A second spring element 144 may then be positioned between the chassis 130 and the mounting bracket 140 (see FIG. 1B). Alternatively, the mounting brackets 140 are integrated into the chassis 130. Additionally, spring elements 144 may be provided between the bushings 134 and the mounting brackets 140. In a further alternative embodiment, the bushings 134 are connected directly to the chassis 130 and mounting brackets

140 are omitted. In yet further embodiments, spring elements 136 may also be placed between the bushing 134 and the chassis 130.

Super elastic shape memory alloys may be understood as alloys that are deformable by strains of up to 4 percent to 8 percent upon the application of a force and recover to the original shape once the force is removed. Super elastic shape memory alloys include, e.g., nickel-titanium alloys, which may include 51 to 57 percent by weight nickel of the total weight of the alloy, with the remainder titanium. Further, up to 30 percent by weight of the nickel may be replaced with copper, or up to 1 percent by weight of the nickel may be replaced with chromium. Another super elastic shape memory alloy includes, e.g., copper-aluminum-beryllium alloys including 11 to 14.5 percent by weight copper, 0.5 percent by weight beryllium, with the remainder aluminum.

Figure 2:
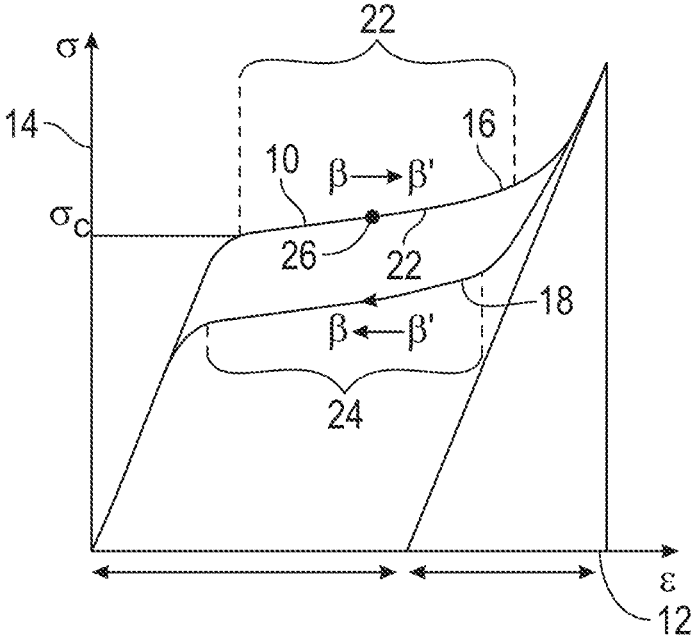
FIG. 2 illustrates a representative elastic hysteresis curve for a super elastic shape memory alloy element.

Super elastic shape memory alloys exhibit an elastic hysteresis curve, such as the curve 10 illustrated in FIG. 2, where the strain ε is represented on the abscissa 12 and the stress σ is represented on the ordinate 14. Upon the application of strain, a stress is induced in the super elastic shape memory alloy as seen in the upper portion of the curve 16. A first phase transformation plateau 22 is exhibited by the alloy as the super elastic shape memory alloy transforms from a first, austenite crystalline structure to a second, stress-induced martensite crystalline structure. As the stress is released and the strain is recovered, seen in the lower portion of the curve 18, a second phase transformation plateau 24 is exhibited as the super elastic shape memory alloy transforms back from the second, stress-induced martensite crystalline structure to the first austenite crystalline structure. The difference between the curves 16, 18 is due to the dissipation of energy (including vibration), which may be released as heat.

In embodiments, the super elastic shape memory alloy elements 160 (see FIGS. 2 through 7) are configured such that the super elastic shape memory alloy elements 160 are pre-strained when the vibration isolation component is formed or upon assembling the vibration isolation system with the electric drivetrain 120 and the chassis 130. The pre-strain is applied under tension or compression, such that the nominal stress lies at a point 26 on the first transformation plateau 22 of the hysteresis curve 16. In alternative embodiments, the super elastic shape memory alloy elements 160 are unstrained when assembled with the chassis 130 and electric drivetrain 120 but are placed under strain during operation of the vehicle that results in the nominal stress in these elements to be at point 26.

Figure 3A:
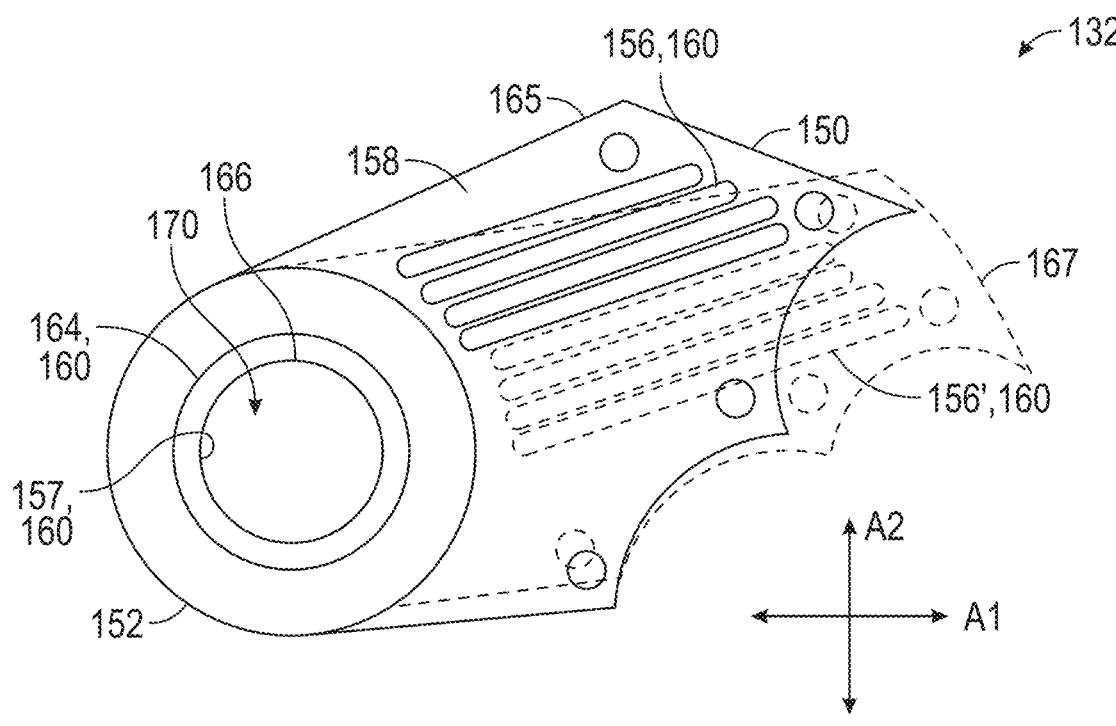
FIG. 3A illustrates an embodiment of a bracket incorporating a super elastic shape memory alloy element according to various aspects of the present disclosure.
Figure 3B:
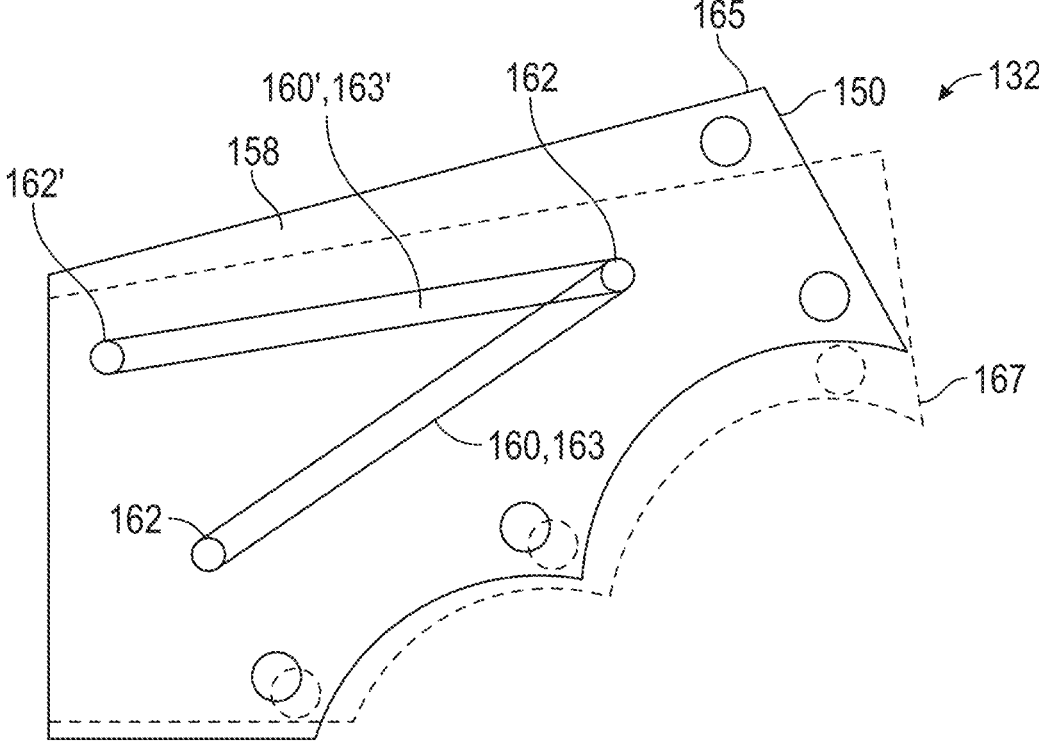
FIG. 3B illustrates an embodiment a super elastic shape memory alloy element in the form of a wire according to various aspects of the present disclosure.

Reference is now made to FIGS. 3A and 3B, which illustrate a drivetrain bracket 132. In embodiments, the drivetrain bracket 132 provides a vibration isolation component in the vibration isolation system. In the illustrated embodiment of FIG. 3A, the drivetrain bracket 132 includes four elongated strips 156, similar to popsicle sticks, formed from super elastic shape memory alloy elements 160 integrated in a central portion 158 of drivetrain bracket 132 between the first end 150 and the second end 152. It should be appreciated that while four strips 156 are illustrated, only one strip 156 may be present, two to three strips may be present, or numerous strips 156 may be present. Further, in alternative or additional aspects, the super elastic shape memory elements 160 may extend along the edges of the drivetrain bracket 132. The strips 156 may be connected to a surface of the drivetrain bracket 132 or embedded within the drivetrain bracket 132, wherein a polymer material is molded over the strips 156.

FIG. 3B illustrates the two posts 162 that are included in the drivetrain bracket 132 around which a wire 163 including a super elastic shape memory alloy element 160 is wound. It should be appreciated that while two posts 162 are illustrated, greater than two posts, may be present. In embodiments, the posts 162 extend out from a surface of the drivetrain bracket 132, being connected to or integrated with the drivetrain bracket 132, wherein the posts 162 and the drivetrain bracket 132 are formed from a single piece of material. In alternative embodiments, the posts 162 are embedded in the drivetrain bracket 132. The super elastic shape memory alloy elements 160 are connected to the posts 162. In embodiments, where the wire 163 is embedded in the drivetrain bracket 132, the wire 163 is wrapped around the posts 162 prior to over molding with a polymer material to form the remainder of the drivetrain bracket 132. As illustrated, the super elastic shape memory alloy elements 160 assume the shape of a rectangle or elongated ellipse; however, in alterative embodiments, the super elastic shape memory alloy elements 160 assume the shape of, e.g., a ring, triangle, trapezoid, parallelogram, or other geometry.

While strips 156 and wires 163 are illustrated as providing the super elastic shape memory alloy elements 160, as noted above, in additional, or alternative embodiments, the super elastic shape memory alloy elements 160 may be provided in other configurations, including fibers or other discrete particles that are embedded in a polymer material used to form the drivetrain bracket 132 or embedded in one or more layers that are used to form the drivetrain bracket 132. In yet further embodiments, the super elastic shape memory alloy elements 160 are embedded between layers forming the drivetrain bracket 132. And, in yet further embodiments, the drivetrain bracket 132 may be formed of the super elastic shape memory alloy element 160.

FIGS. 3A and 3B also illustrate the effect of the application of strain upon the drivetrain bracket 132 when the drivetrain bracket 132 is assembled on the chassis 130 with the electric drivetrain 120 if strain is not induced in the super elastic shape memory alloy elements 160 when forming the drivetrain bracket 132 or, alternatively, in addition to any pre-strain in the super elastic shape memory alloy elements 160. In the illustrated aspect of FIGS. 3A and 3B, upon installation and connecting the drivetrain bracket 132 between the chassis 130 and electric drivetrain 120, the drivetrain bracket 132 deforms in one or more axis, such as in a first axis A1 and a second axis A2. A strain may also be applied in a third axis (not illustrated). Accordingly, the shape of the drivetrain bracket 132 deforms from a first geometry 165 to a second geometry 167 and a strain is applied upon the super elastic shape memory alloy elements 160, which also shift and elongate or compress, see strips 156', wires 163' and posts 162'.

Figure 3C:
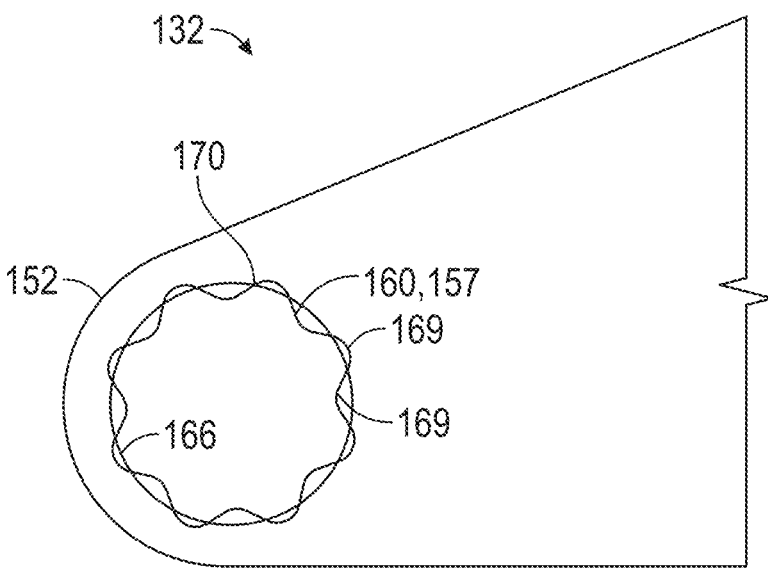
FIG. 3C illustrates an embodiment of a super elastic shape memory alloy element according to various aspects of the present disclosure.

With reference again to FIG. 3A as well as FIG. 3C, the drivetrain bracket 132 defines an opening 170 in the second end 152 of the drivetrain bracket 132 for receiving the bushing 134. In embodiments, in addition, or alternatively, to the strips 156, a super elastic shape memory alloy element 160 in the form of a ring 157 or another element lines the wall 166 defining the opening 170 of the drivetrain bracket 132. Alternatively, or additionally, a super elastic shape memory alloy element 160, 164 in the shape of a ring or another element is embedded within the drivetrain bracket 132 around the wall 166 defining the opening 170 or connected to the drivetrain bracket 132 around the opening 170.

To pre-strain the super elastic shape memory alloy elements 160, 164, 157 near the opening 170 noted above, the super elastic shape memory alloy elements 160, 164, 157 may be enlarged by the insertion of the bushing 134 into the opening 170 of the drivetrain bracket 132. Alternatively, or in addition, as illustrated in FIG. 3C, the super elastic shape memory alloy element 160, 164 connected to the drivetrain bracket 132 or the super elastic shape memory alloy element 160, 157 lining the wall 166 defining the opening of the drivetrain bracket 132, may exhibit the shape of an ellipse or include various waves 169 and upon installation of the bushing 134 in the opening 170, or upon assembling of the drivetrain bracket 132 with the electric drivetrain 120 and the chassis 130, the super elastic shape memory alloy element 160 is strained into the shape of the ring.

Figure 4:
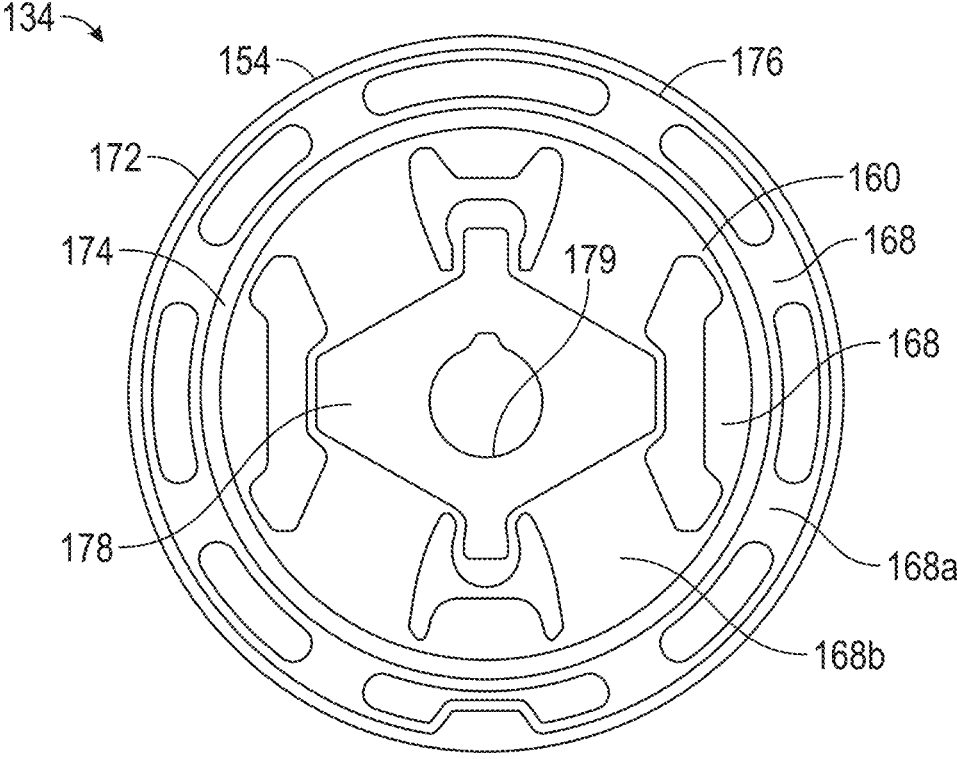
FIG. 4 illustrates an embodiment of a bushing incorporating a super elastic shape memory alloy element according to various aspects of the present disclosure.

Turning now to FIG. 4, FIG. 4 illustrates an embodiment of a bushing 134. In embodiments, the bushing 134 is a vibration isolation component. The bushing 134 includes one or more rubber components 168 for damping and isolating vibration. As noted, the bushing 134 is retained by the second end 152 of the drivetrain bracket 132 at the periphery 154 of the bushing 134. As illustrated, the drivetrain bracket 132 defines an opening 170 in which the bushing 134 is retained (see, e.g., FIG. 3A). The bushing 134 may be provided in alternative locations in the vehicle 100 as well, such as between the mounting bracket 140 and the chassis 130 or located in other portions of the vehicle where vibration may cause an issue, such as in the passenger compartment.

The bushing 134, as illustrated in FIG. 4, includes an outer ring 172 received by the drivetrain bracket 132. In embodiments, the outer ring 172 may include interlocking features that mate with features in the opening 170 defined in the bracket 132. The bushing 134 also includes a rubber component 168 connected to the outer ring 172. Further, an inner ring 174 and an inner insert 178 are connected to the rubber component 168.

The periphery 176 of the rubber component 168 is connected to the outer ring 172 either mechanically or chemically with an adhesive. The outer ring 172 is formed from metal, metal alloy, or a polymer such as polyacetal, polyamide, high density polyethylene, poly(p-phenylene oxide), and poly(p-phenylene ether). Alternatively, the outer ring 172 is also a super elastic shape memory alloy element 160. The outer ring 172 may also be pre-strained by the rubber component 168, pre-strained when the bushing is inserted into the wall 166 defining the opening 170 for receiving the bushing 134, or pre-strained upon assembling the electric drivetrain 120 to the chassis 130 with the vibration isolation system.

The rubber component 168 is formed from, e.g., natural rubber, synthetic elastomer such as polyisoprene, or polyurethane. The rubber component 168 may also define a number of openings or may be solid. The rubber component 168 may also include multiple portions 168a, 168b, wherein the first portion 168a is connected between the outer ring 172 and the inner ring 174 and the second portion 168b is connected between the inner ring and the inner insert 178.

The inner ring 174 is connected to the rubber component 168. In embodiments, the inner ring 174 may be substituted or used in combination with elongate fins extending from the inner insert 178 towards the periphery 176, or multiple inner rings 174 may be present. Each of the inner ring(s) 174 and elongate fins may be configured to target different deformation modes of distortion during operation. In embodiments, the inner ring(s) 174 or elongated fins are a super elastic shape memory alloy element 160. In further embodiments, and as noted above, the super elastic shape memory elements 160 may be pre-strained upon assembly by the rubber component 168, pre-strained when the bushing 134 is inserted into the drivetrain element 132, or pre-strained upon assembling the electric drivetrain 120 to the chassis with the vibration isolation system. In further embodiments, the inner ring(s) 174 may exhibit a geometry that deviates from a circle, and may be elliptical or include waves, which flatten out to a circular ring when strain is applied. Similarly, elongated fins, when present, may be curvate and flatten when strain is applied.

The inner insert 178 includes a mating surface 179 for receiving a mechanical fastener that couples the bushing 134 to the mounting bracket 140 or to the chassis 130. The inner insert 178 is formed from metal, metal alloy, or a polymer such as polyacetal, polyamide, high density polyethylene, poly(p-phenylene oxide), and poly(p-phenylene ether). The inner insert 178 may be mechanically or chemically attached to the rubber component 168.

Figure 5:
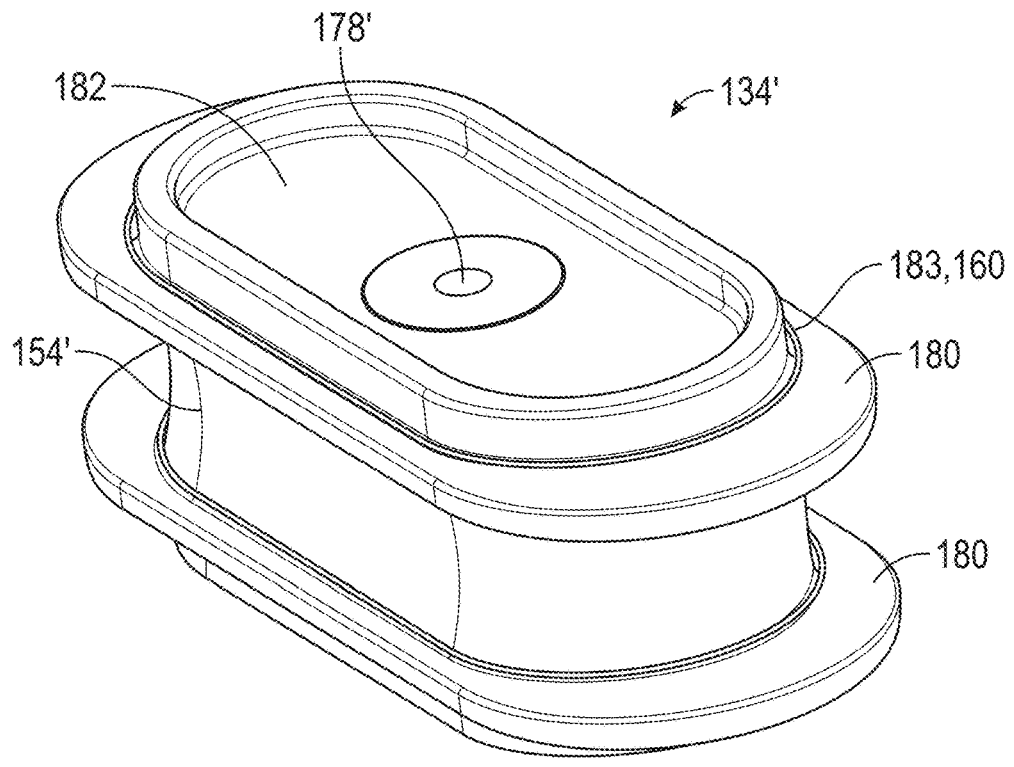
FIG. 5 illustrates an embodiment of a bushing incorporating a super elastic shape memory alloy element according to various aspects of the present disclosure.

FIG. 5 illustrates another embodiment of a bushing 134'. This bushing 134' includes one or more flexible wings 180 extending form the periphery 154' of the bushing 134'. The body 182 of the bushing 134' may be formed from, e.g., a metal, metal alloy, or a polymer such as polyacetal, polyamide, high density polyethylene, poly(p-phenylene oxide), and poly(p-phenylene ether) and an inner insert 178' is provided in the center of the bushing 134'. The wings 180' may be formed from, e.g., natural rubber, synthetic rubber such as polyisoprene, or polyurethane. Super elastic shape memory alloy elements 183, 160 may be connected to the wings 180'. Alternatively, super elastic shape memory alloy elements 183, 160 may be embedded into the wings 180', or the wings 180' may be replaced by similar elements made from the super elastic shape memory alloy.

Figure 6:
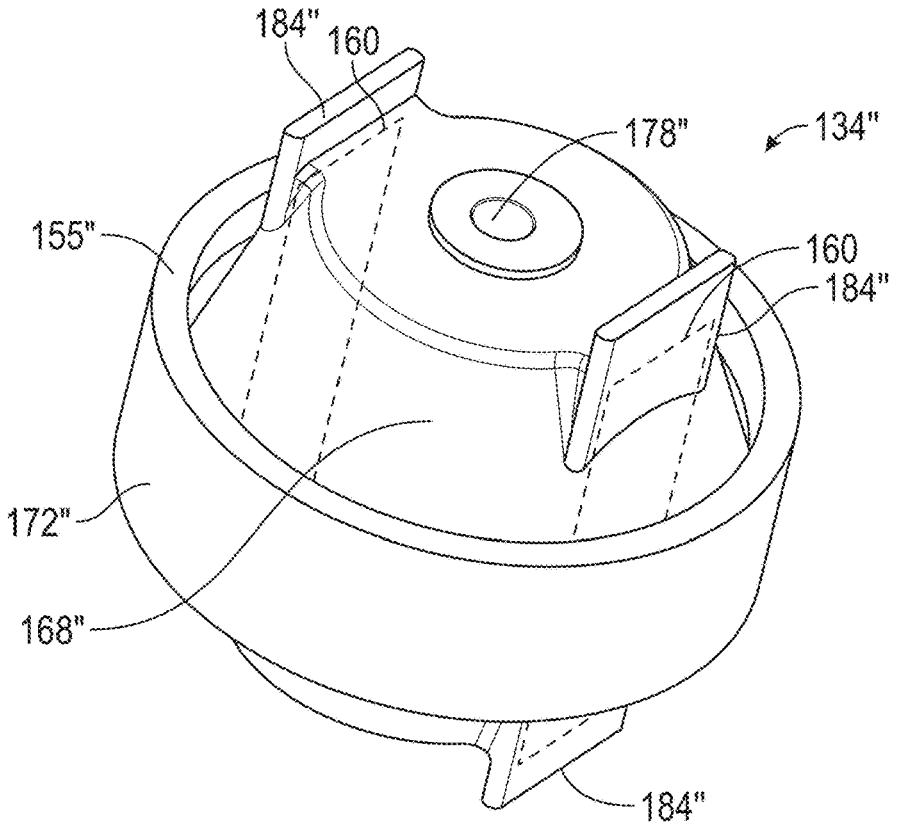
FIG. 6 illustrates an embodiment of a bushing incorporating a super elastic shape memory alloy element according to various aspects of the present disclosure.

FIG. 6 illustrates yet another embodiment of a bushing 134". In the illustrated embodiment, the bushing 134" may include an outer ring 172". A rubber element 168" may be connected to the inner wall 155" of the outer ring 172". An inner insert 178" is connected to the rubber element 168" at the center of the bushing 134". The rubber element 168" includes wings 184" extending from either side of the rubber element 168". The wings 184" may be formed from super elastic shape memory alloy elements 160" or super elastic shape memory alloy elements 160" may be embedded in the wings 184".

In embodiments where the drivetrain bracket 132 includes a super elastic shape memory alloy, the super elastic shape memory alloy may be omitted from the bushing 134, 134', 134".

Figure 7A:
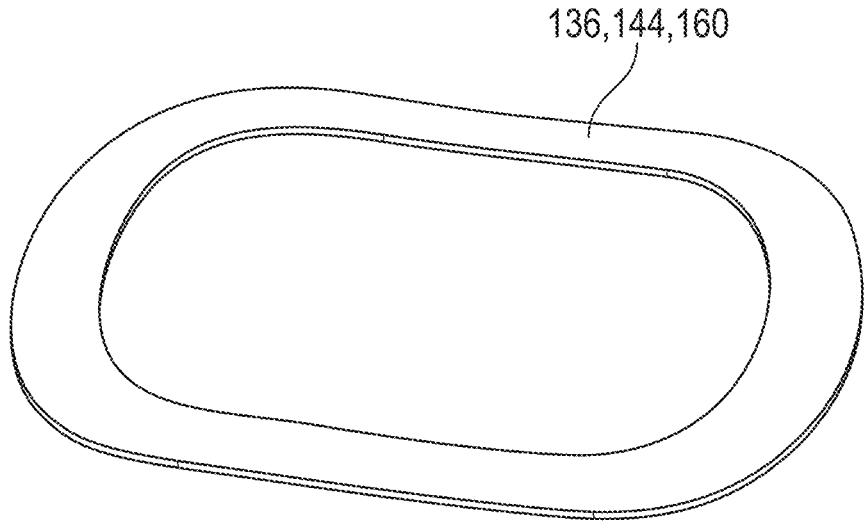
FIG. 7A illustrates an embodiment of a spring washer formed from a super elastic shape memory alloy, providing a super elastic shape memory alloy element, according to various aspects of the present disclosure.
Figure 7B:
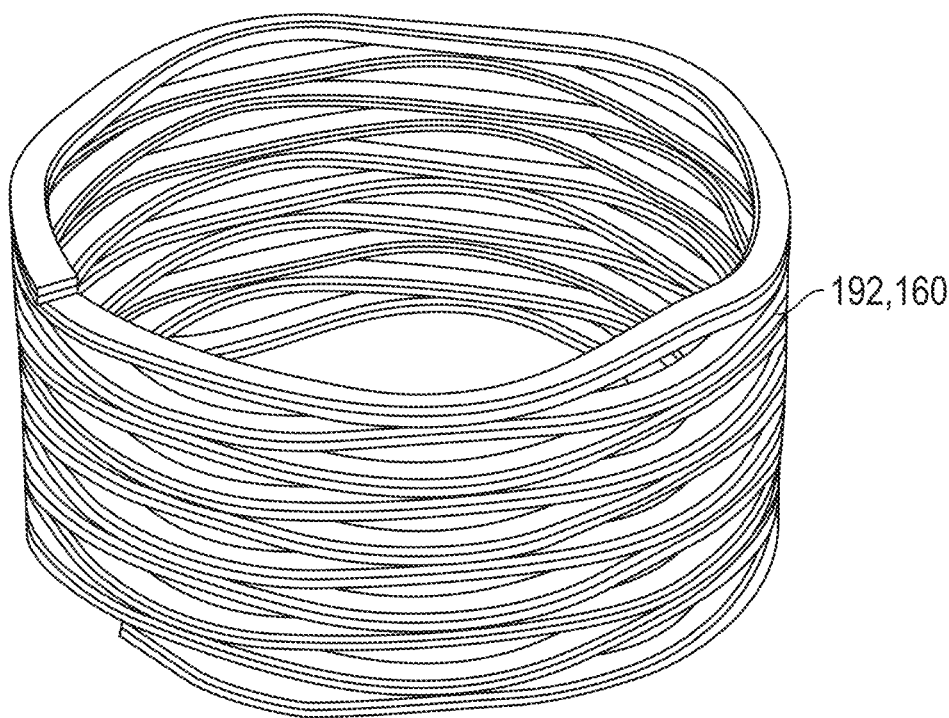
FIG. 7B illustrates an embodiment of a wave spring incorporating a super elastic shape memory alloy, providing a super elastic shape memory alloy element, according to various aspects of the present disclosure.
Figure 7C:
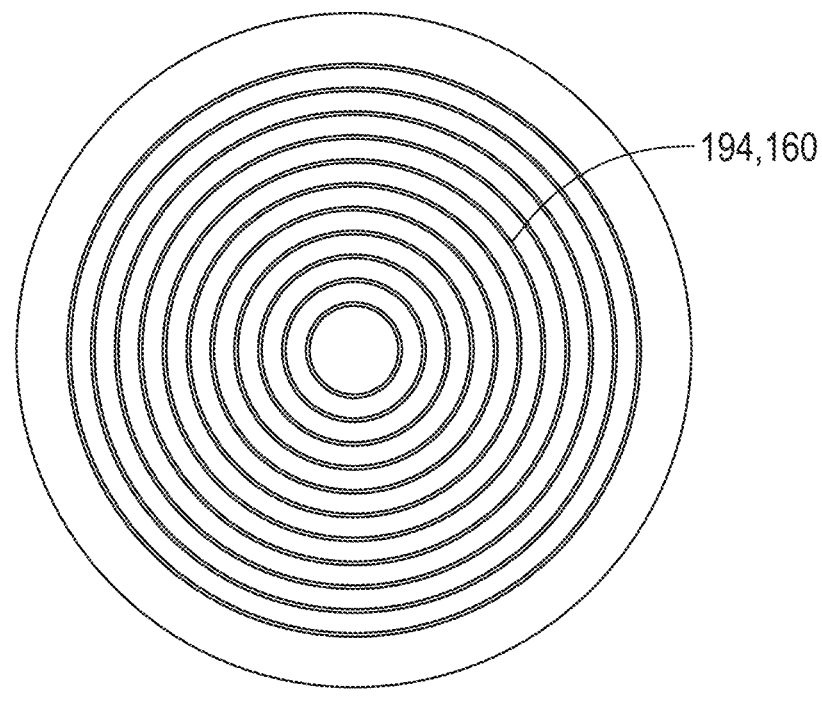
FIG. 7C illustrates an embodiment of another element incorporating a super elastic shape memory alloy according to various aspects of the present disclosure.
Figure 7D:
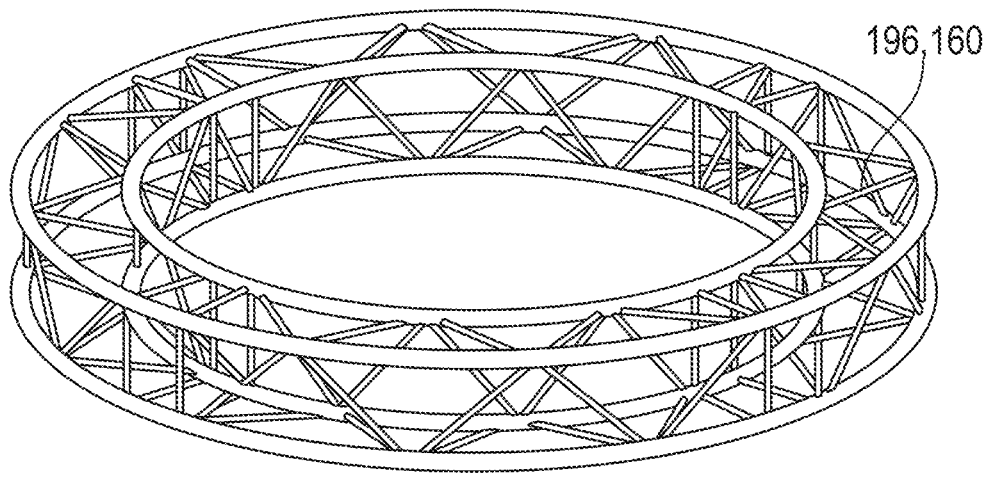
FIG. 7D illustrates an embodiment of further element incorporating a super elastic shape memory alloy according to various aspects of the present disclosure.
Figure 7E:
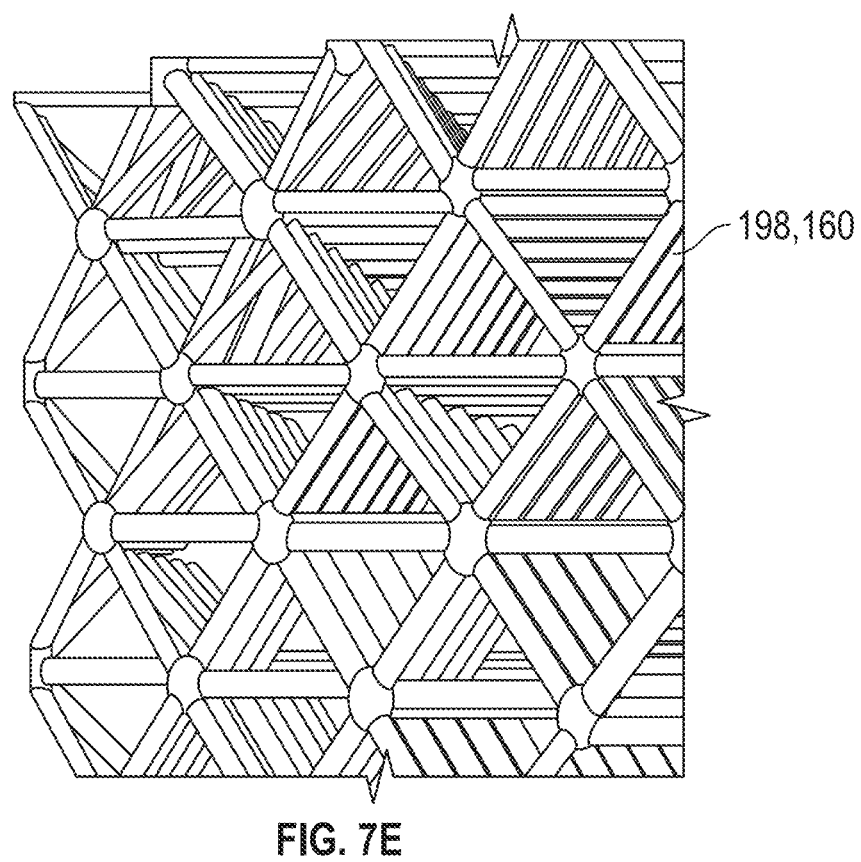
FIG. 7E illustrates an embodiment of yet an additional element incorporating a super elastic shape memory alloy according to various aspects of the present disclosure.
Figure 7F:
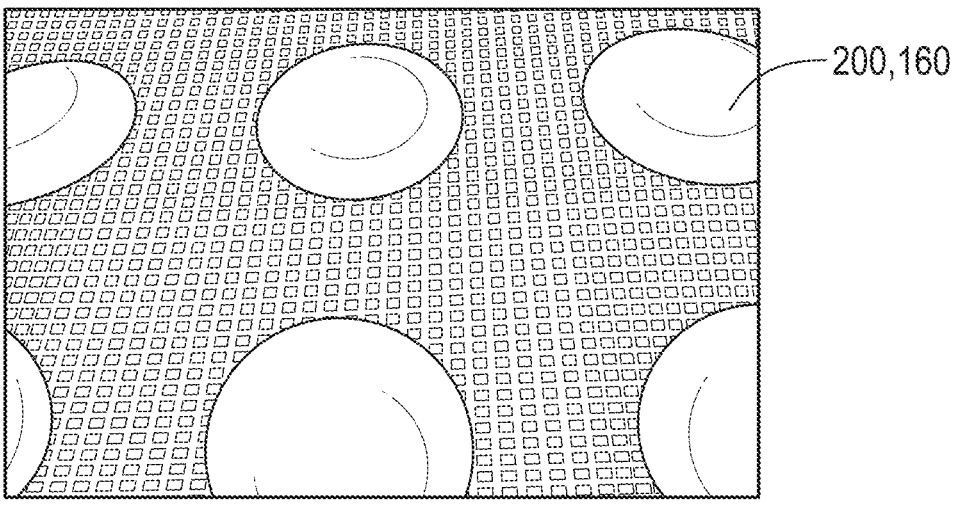
FIG. 7F illustrates an embodiment of yet another element incorporating a super elastic shape memory alloy according to various aspects of the present disclosure.
Figures 7G, 8:
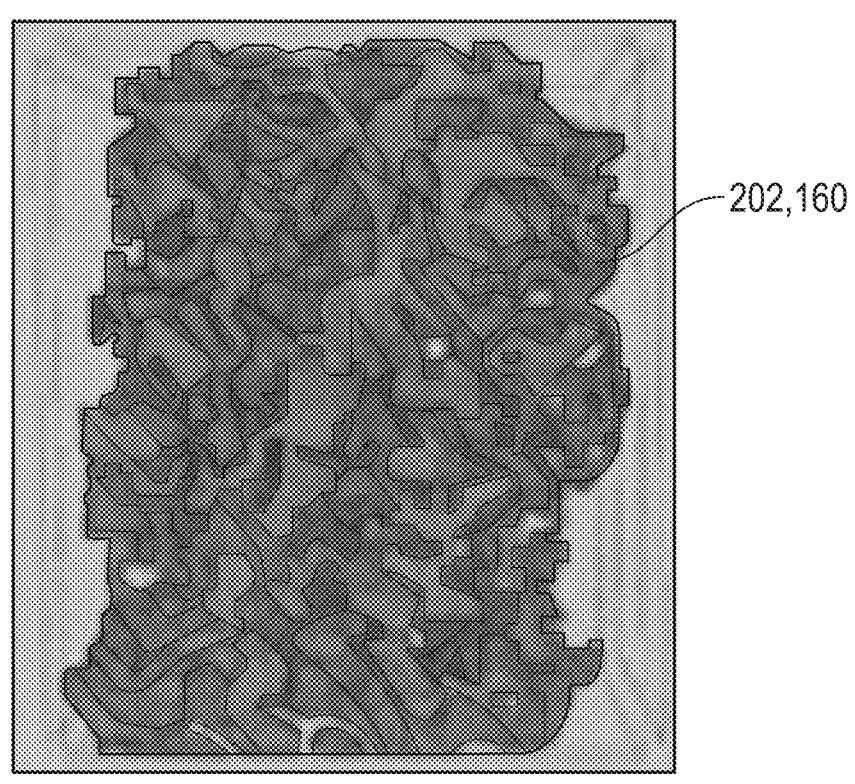
FIG. 7G illustrates an embodiment of yet a further element incorporating a super elastic shape memory alloy according to various aspects of the present disclosure.
FIG. 8 illustrates a method of reducing vibration in an electric motor according to various aspects of the present disclosure.

FIGS. 7A through 7G illustrate various spring elements 136. In embodiments, the spring elements 136 also include a super elastic shape memory alloy element 160. Turning now to FIG. 7A, FIG. 7A illustrates a spring washer 136, 144. FIG. 7B illustrates a wave spring 192, which may be substituted for the spring washer 136, 144. FIGS. 7C through 7G illustrate other embodiments of spring elements 136. FIG. 7C illustrates a corrugated plate 194 including a plurality of ripples, FIG. 7D illustrates a compressible truss 196, FIG. 7E illustrates another embodiment of a compressible truss 198, FIG. 7F illustrates a dimpled element 200 including a plurality of dimples, and FIG. 7G illustrates a foamed element 202.

As noted above, one or more of these spring elements 136 may be placed between the drivetrain bracket 132 and the electric drivetrain 120 as well as between the mounting bracket 140 and the bushing 134 or between the mounting bracket 140 and the chassis 130 if the mounting bracket 140 is present. In the case of spring washers 136, 144 and wave springs 136, 192, the spring elements 136 may be placed under a pre-strain by fitting the spring washer 136, 144 or wave spring 136, 192 over a mechanical fastener 138, 142. In embodiments, the spring elements 136 are pre-strained by the mechanical fastener 138, 142.

During use, when vibrations from the electric drivetrains 120 are applied to the super elastic shape memory alloy elements 160, the super elastic shape memory alloy elements 160 will deform, from either a pre-strained or un-strained shape and provide damping upon the inducement of stress. However, as heat may build-up in the super elastic shape memory alloy elements 160 as they undergo phase transformations, it may be useful to mitigate heat to prevent a reduction in the super elastic shape memory properties of the super elastic shape memory alloy elements 160. Mitigation measures may include, conductive or convective cooling, such as connecting a heat sink 204 (see FIG. 1B) to the super elastic shape memory alloy element 160, either directly or through contact with components adjacent to the super elastic shape memory alloy element 160 or provide air flow around the super elastic shape memory alloy elements 160. For example, thermally conductive polymers or metals may be used in components that touch the super elastic shape memory alloy elements.

Turning now to FIG. 8, with further references to FIGS. 1 and 3A through 7G, the present disclosure also relates to a method 400 of isolating vibration in a drivetrain. At block 402, the method 400 includes affixing a drivetrain bracket 132 to an electric drivetrain 120 at a first end of the drivetrain bracket 132. In affixing the drivetrain bracket 132 to the electric drivetrain 120 a spring element 160 including a super elastic shape memory alloy, if present, may be positioned between the drivetrain bracket 132 and electric drivetrain 120 At block 404, a bushing 134 is inserted into an opening 170 defined in the drivetrain bracket 132. Optionally, at block 406, additional spring elements 136, if present, are positioned between the bushing 134 and the chassis 130 or the mounting bracket 140. Again, at least one of the components noted above, i.e., the drivetrain bracket 132 and the bushing 134, is a vibration isolating component including a super elastic shape memory alloy. At block 408, the bushing 134 may be connected to a chassis 130, such as by connecting the bushing 134 to a mounting bracket 140 or connecting the bushing 134 to the chassis 130. Optionally, at block 410 the mounting bracket 140 is connected to the chassis 130 if it is not already integrated into the chassis 130. It should be appreciated that the order of the blocks may be varied. In addition, as noted above, the super elastic shape memory alloy elements 160 may be pre-strained upon forming either, or both of, the drivetrain bracket 132 or the bushing 134.

The present embodiments of the vibration isolation system and components provide several advantages. These advantages include, for example, the relatively compact form factors that the super elastic shape memory alloys may assume to replace polymer materials, that would require a larger mass and volume to provide similar mechanical and damping characteristics. Further advantages include the use of less material as compared to polymer material to gain a similar or better strength and damping. These advantages also include the damping of a wider range of frequencies, in a range from 10 Hz to 3,000 Hz, which may be achieved by tuning the super elastic shape memory alloy, either through making alterations in the material composition or alterations in the material geometry.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A vibration isolation system for a drivetrain, comprising:
a drivetrain bracket including a first end and a second end, wherein the first end is connected to an electric drive train and the second end defines an opening;
a bushing inserted into the second end of the drivetrain bracket, wherein the periphery of the bushing is received in the opening; and
a mounting bracket connected to a chassis and the bushing, wherein the drivetrain bracket includes a first super elastic shape memory alloy element in the form of a ring, and wherein the ring is enlarged by the insertion of the bushing into the opening.

2. The vibration isolation system of claim 1, further comprising a plurality of posts extending from the drivetrain bracket, and a second super elastic shape memory alloy element in the form of a wire wound on the posts.

3. The vibration isolation system of claim 1, wherein the first super elastic shape memory alloy element is embedded in the drivetrain bracket.

4. The vibration isolation system of claim 1, wherein the ring is at least partially embedded in the opening.

5. The vibration isolation system of claim 1, wherein the bushing includes a rubber component and the rubber component includes a second super elastic shape memory alloy element connected to the rubber component.

6. The vibration isolation system of claim 5, wherein the second super elastic shape memory alloy element further includes at least one of the following: an inner ring and an elongate fin.

7. The vibration isolation system of claim 5, wherein the bushing includes a body and wings extending from the body, wherein the wings include the second super elastic shape memory alloy element.

8. The vibration isolation system of claim 1, further comprising at least one spring element insertable between the drivetrain bracket and the drivetrain.

9. The vibration isolation system of claim 8, wherein the spring element is a spring washer and the spring washer includes a super elastic shape memory alloy.

10. The vibration isolation system of claim 1, wherein the ring is a wave in shape and at least partially embedded in the drivetrain bracket.

11. The vibration isolation system of claim 1, wherein the opening is defined by a wall in the drivetrain bracket and the ring lines the wall.

12. The vibration isolation system of claim 1, wherein the ring is in the shape of an ellipse.

13. The vibration isolation system of claim 1, wherein the drivetrain bracket further includes one or more strips, wherein the strips include a super elastic shape memory alloy.

14. A vibration isolation component for a vehicle, comprising:
a drivetrain bracket including a first end, a second end, and a central portion between the first end and the second end, wherein the first end is connected to an electric drivetrain;
an opening defined in the second end of the drivetrain bracket, wherein a bushing is received in the opening;
a mounting bracket connected to a chassis and the bushing; and a first super elastic shape memory alloy element integrated with the drivetrain bracket, wherein the first super elastic shape memory alloy element is in the form of a ring, wherein the ring is enlarged by the insertion of the bushing into the opening.

15. The vibration isolation component of claim 14, further comprising a second super elastic shape memory alloy element embedded into the central portion of the drivetrain bracket.

16. The vibration isolation component of claim 14, wherein the first super elastic shape memory alloy element is at least partially embedded in the drivetrain bracket.

17. The vibration isolation component of claim 14, wherein the first super elastic shape memory alloy element lines the opening.

18. The vibration isolation component of claim 14, wherein the first super elastic shape memory alloy element is under strain.

\* \* \* \* \*